United States Patent
Palus

(10) Patent No.: US 9,405,637 B2
(45) Date of Patent: Aug. 2, 2016

(54) LOCKING/UNLOCKING CPUS TO OPERATE IN SAFETY MODE OR PERFORMANCE MODE WITHOUT REBOOTING

(75) Inventor: Alexandre Pierre Palus, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1303 days.

(21) Appl. No.: 13/008,082

(22) Filed: Jan. 18, 2011

(65) Prior Publication Data

US 2012/0185628 A1    Jul. 19, 2012

(51) Int. Cl.
*G06F 9/30* (2006.01)
*G06F 11/16* (2006.01)
*G06F 9/38* (2006.01)

(52) U.S. Cl.
CPC .......... *G06F 11/1641* (2013.01); *G06F 9/3861* (2013.01); *G06F 11/1658* (2013.01); *G06F 11/1675* (2013.01); *G06F 2201/845* (2013.01)

(58) Field of Classification Search
None
See application file for complete search history.

(56) References Cited

U.S. PATENT DOCUMENTS

| | | | |
|---|---|---|---|
| 4,893,233 A * | 1/1990 | Denman et al. | 712/244 |
| 6,101,580 A * | 8/2000 | Agesen et al. | 711/132 |
| 6,754,787 B2 | 6/2004 | Miller et al. | |
| 7,370,232 B2 | 5/2008 | Safford | |
| 7,747,897 B2 | 6/2010 | Racunas et al. | |
| 2002/0099933 A1* | 7/2002 | Nevill et al. | 712/228 |
| 2006/0026312 A1* | 2/2006 | Chauvel | 710/23 |
| 2007/0277023 A1* | 11/2007 | Weiberle et al. | 712/229 |
| 2011/0179255 A1* | 7/2011 | Pathirane et al. | 712/207 |

\* cited by examiner

*Primary Examiner* — William B Partridge
(74) *Attorney, Agent, or Firm* — Gregory J. Albin; Frank D. Cimino

(57) ABSTRACT

An embodiment of the invention provides a method for changing a multi-processor system from a performance mode to a safety mode while the system continues to run software. When an external event or exception occurs, context is switched from the performance mode to the safety mode. After context is switched, at least one pair of CPUs is synchronized to operate in the safety mode. In addition, a multi-processor system may be switched form the safety mode to the performance mode while the software continues to operate.

7 Claims, 3 Drawing Sheets

LOCKING/UNLOCKING CPUS TO OPERATE IN SAFETY MODE OR PERFORMANCE MODE WITHOUT REBOOTING

BACKGROUND

Multi-processor (i.e. multiple CPUs (Central Processing Unit)) systems may operate in different modes. For example, a multi-processor system may operate in a lock-step (safety) mode or in a non-lock-step (performance) mode. Lock-step mode is used to achieve high diagnostic ability. In lock-step mode, one or more processors (CPUs) perform the same operations. For example, when two processors are operating in the lock-step mode, they are initialized to the same state during system start-up, and they receive the same inputs (Le, code, bus operations and asynchronous events). As a consequence, during lock-step mode, the state of the two processors is identical from clock to clock when no errors occur.

However, when an error occurs in either processor between the states of two processors, differences in the behavior may be detected by comparing signals at key places (e.g. data buses and address buses) in the multi-processor system. In the lockstep mode, the multi-processor system monitors signals at key places and flags an error when there is a discrepancy.

In performance mode, the processors in a multi-processor system may be used to execute a single sequence of instructions in multiple contexts (single-instruction, multiple-data (SIMD)) or multiple sequences of instructions in multiple contexts (multiple-instruction, multiple-data (MIMD)). SIMD multiprocessing is well suited to parallel or vector processing, in which a very large set of data can be divided into parts that are individually subjected to identical but independent operations. A single instruction stream directs the operation of multiple CPUs to perform the same manipulations simultaneously on potentially large amounts of data.

MIMD multiprocessing is suitable for a wide variety of tasks in which completely independent and parallel execution of instructions touching different sets of data can be put to productive use. Processing may be divided into multiple threads, each with its own hardware processor state, within a single software-defined process or within multiple processes. Insofar as a system has multiple threads awaiting dispatch (either system or user threads), this architecture makes good use of hardware resources.

A multi-processor system, such as a system-on-a-chip (SOC) or an embedded system, may contain digital, analog, mixed-signal and often radio-frequency functions, all on a single chip substrate. An SOC or embedded system is a multi-processor system often used to perform one or a few dedicated functions. Often these dedicated functions have real-time computing constraints where safety is an issue. For example, an SOC or an embedded system may be used to control the braking of an automobile.

Therefore, it is important that a multi-processor system may be switched from a safety mode to a performance or from a performance mode to a safety mode. When there is a demand for data integrity, such as in the safety mode, the multi-processor system may be switched to the safety mode. When there is a demand for performance and data integrity is less important, the multi-processor system may be switched to the performance mode. When the multi-processor system switches modes, it is important that the operating system (OS) switch cleanly between the modes with as little time delay as possible.

DETAILED DESCRIPTION

The drawings and description, in general, disclose a method and system of changing from a performance mode to a safety mode and from a safety mode to a performance mode in a multi-processor system while software continues to operate. In one embodiment, an external event or exception causes the multi-processor system to change from a performance mode to a safety mode. After the external event or exception occurs, the context of the processors (CPUs) in the performance mode is saved in memory and the context of the safety mode is loaded in two or more of the processors.

Next two or more processors are synchronized in order to operate in the safety (lock-step) mode. Part of the process of synchronizing two or more processors includes suspending execution of the processors, resetting parts of each processor (e.g. an PFU (prefetch unit) or an RTU (return stack unit)), and resetting a compare unit. After the processors are synchronized, the processors are released and they are now in lock-step.

Figure 1:
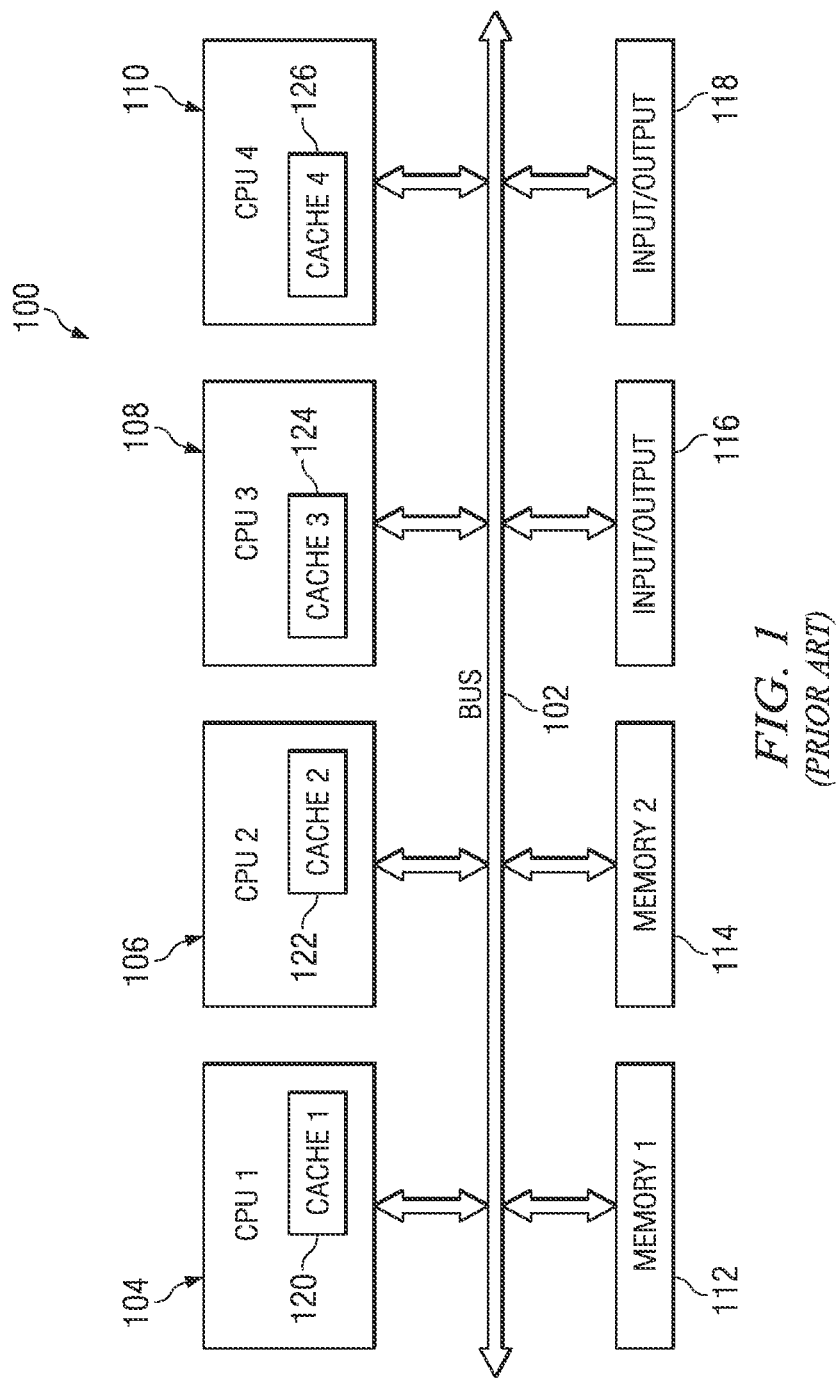
FIG. 1 is a block diagram of a computer system comprising a plurality of CPUs (central processing units), memory devices, I/O (input/output) devices and a bus. (Prior Art)

FIG. 1 is a block diagram of a computer system comprising a plurality of CPUs (central processing units), memory devices, I/O (input/output) devices and a bus. In this example, four processors, CPU1-CPU4 are connected to bus 102. In addition, two memories, 112 and 114, are connected to bus 102 along with two I/O devices 116 and 118. Each of the processors, CPU1-CPU4, has a cache, CACHE1-CACHE4 respectively.

Any of the processors, 104-110, may write and read data from the memories 112 and 114 and the I/O devices 116 and 118. In a multi-processor system 100 as shown in FIG. 1, the processors, 104-110, may be used to execute a single sequence of instructions in multiple contexts, multiple sequences of instructions in a single context, used for redundancy in fail-safe systems, or multiple sequences of instructions in multiple contexts.

A multi-processor system 100 may multi-task. Multi-tasking is a method by which multiple tasks, also known as processes, share common processing resources such as CPUs and memory. A process is an instance of a computer program that is being executed. It contains the program code and its current activity. Depending on the operating system (OS), a process may be made up of multiple threads of execution that execute instructions concurrently. In the case of a computer with a single CPU, only one task is said to be running at any point in time, meaning that the CPU is actively executing instructions for that task.

Multitasking schedules which task may be the one running at any given time, and when another waiting task gets a turn. Scheduling refers to the way processes are assigned to run on the available CPUs, since there are typically many more processes running than there are available CPUs. This assignment is carried out by software known as a scheduler and dispatcher. The act of reassigning a CPU from one task to another one is called a context switch.

A context switch is the process of storing and restoring the state (context) of a CPU so that execution can be resumed from the same point at a later time. Context switches are usually computationally intensive and much of the design of operating systems is to optimize the use of context switches. A context switch can mean a register context switch, a task context switch, a thread context switch, or a process context switch. What constitutes the context is determined by the processor and the operating system. Switching from one process to another requires a certain amount of time for doing the administration (i.e. saving and loading registers and memory maps, updating various tables and list etc.).

There are at least two situations where a context switch occurs. For example, a context switch may occur during multitasking as described above or during interrupt handling. Most modern computer architectures are interrupt driven. An interrupt is an asynchronous signal indicating the need for attention or a synchronous event in software indicating the need for a change in execution. A hardware interrupt causes the processor to save its state of execution and begin execution of an interrupt handler. Software interrupts are usually implemented as instructions in the instruction set, which cause a context switch to an interrupt handler similar to a hardware interrupt. An act of interrupting is referred to as an interrupt request (IRQ).

As mentioned above, the state of the process (context) may include all the registers that the process may be using, especially the program counter, plus any other operating system specific data that may be necessary. This data is usually stored in a data structure called a process control block (PCB), or a switchframe. The PCBs are sometimes stored upon a per-process stack in memory or there may be some specific operating system defined data structure for this information.

A typical stack is an area of computer memory with a fixed origin and a variable size. Initially the size of the stack is zero. A stack pointer (SP), usually in the form of a hardware register, points to the most recently referenced location on the stack; when the stack has a size of zero, the stack pointer points to the origin of the stack. A stack usually has two operations: a push operation in which a data item is placed at the location pointed to by a stack pointer, and the address in the stack pointer is adjusted by the size of the data item and a push or pop operation, in which a data item is placed at the location pointed to by the stack pointer, and the address in the stack pointer adjusted by the size of the data item.

There are many variations on the basic principle of stack operations. However, every stack usually has a fixed location in memory at which it begins. As data items are added to the stack, the stack pointer is displaced to indicate the current extent of the stack, which expands away from the origin.

Figure 2:
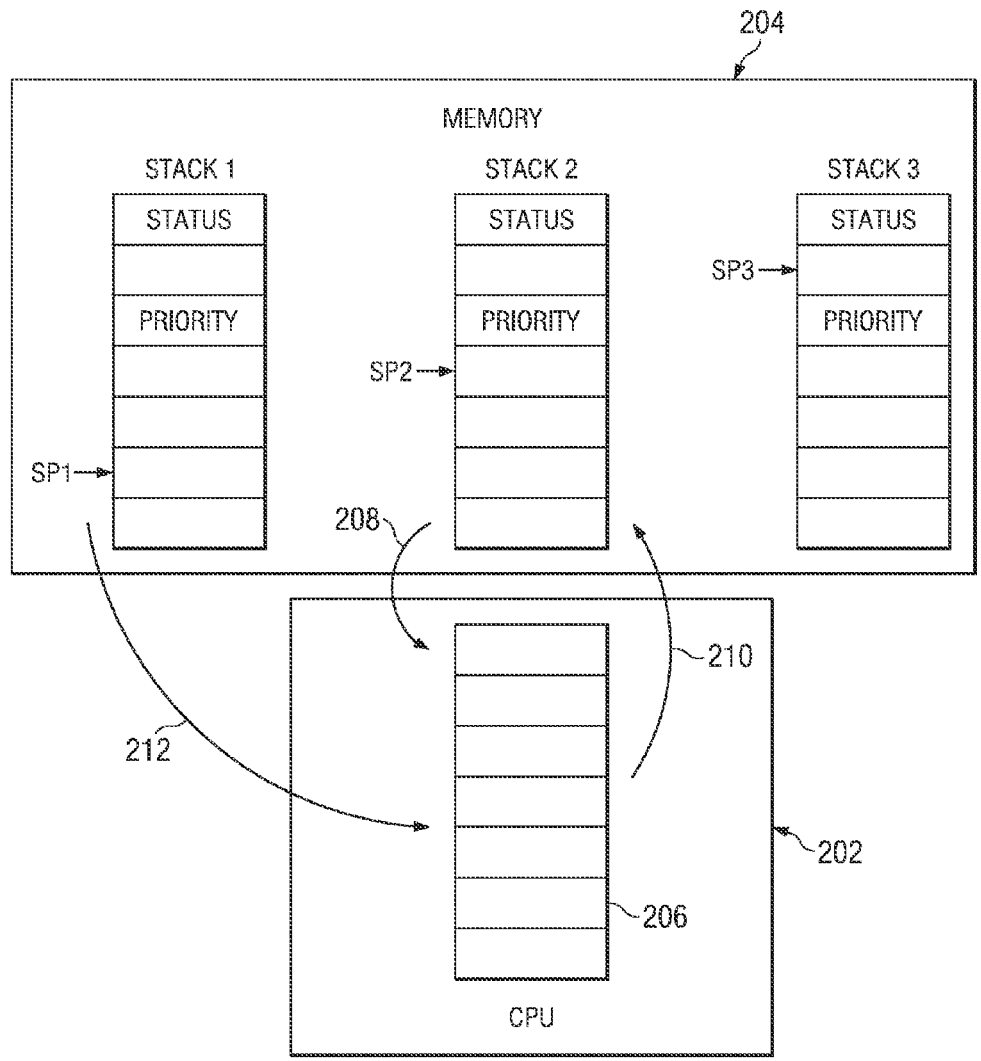
FIG. 2 is a block diagram illustrating how stacks in memory may be used in a single CPU to multi-task. (Prior Art)

FIG. 2 is a block diagram illustrating how stacks in memory may be used with a single CPU to multi-task. In this example, a system 200 is configured to multi-task. The context of three tasks, task1, task2, task3, is stored in stacks 1-3 respectively. Each stack, 1-3, has a least a stack pointer (SP1, SP2, and SP3), status information, and priority information. In this example, the information in stack2 is transferred to the CPU registers 206. After the information is transferred to the CPU registers 206, the CPU 202 works on task2. When an interrupt occurs, the context in the CPU registers 206 is transferred 210 back to stack2 in memory 204 and the context in stack1, for example, may be transferred 212 to the CPU registers 206. After the context in stack1 is transferred 212 to CPU registers 206, the CPU 202 operates on task1.

Figure 3:
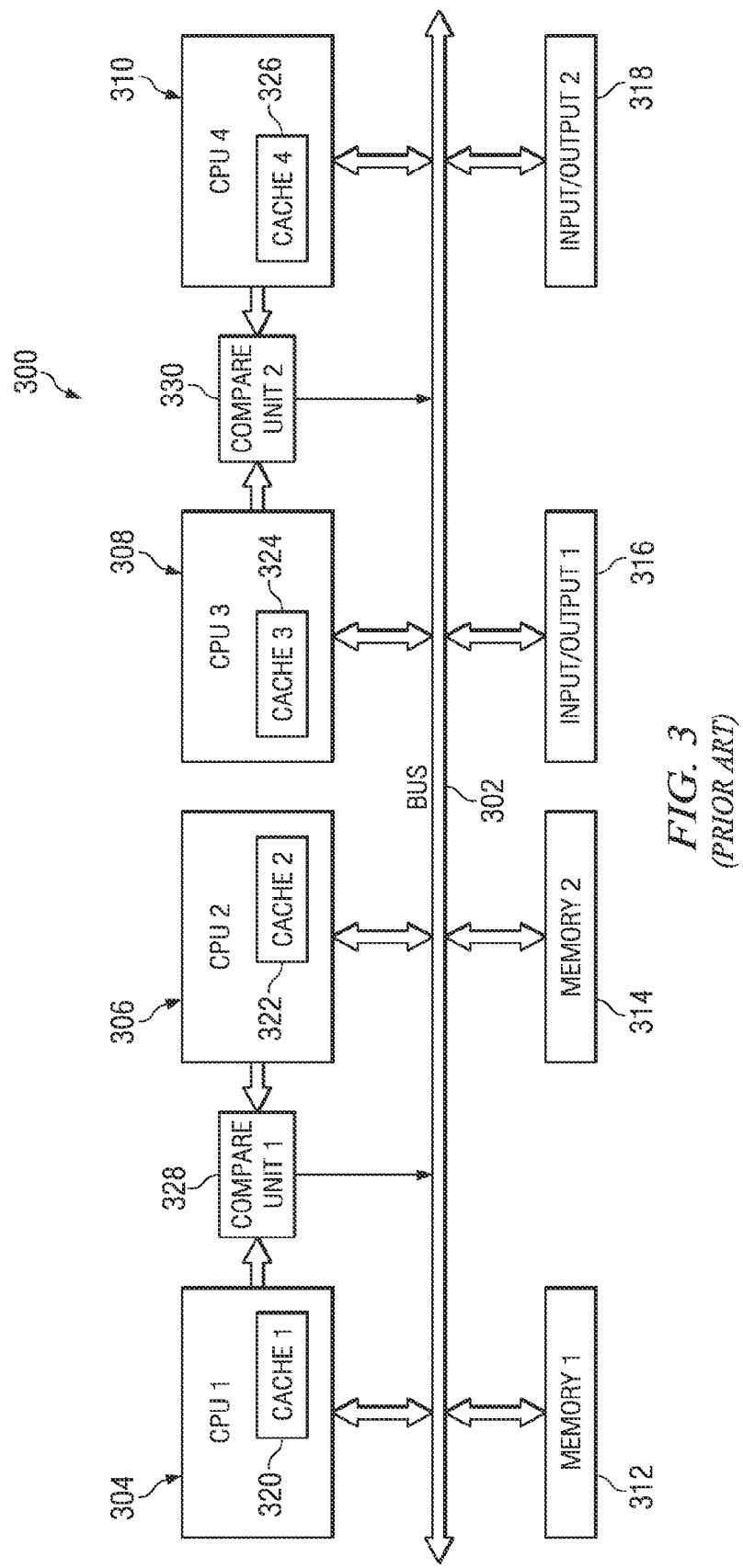
FIG. 3 is a block diagram of a computer system comprising a plurality of CPUs (central processing units), memory devices, I/O (input/output) devices, compare units, and a bus. (Prior Art)

FIG. 3 is a block diagram of a computer system comprising a plurality of CPUs (central processing units), memory devices, I/O (input/output) devices, compare units, and a bus. In this example, four processors, 304-310 are connected to bus 302. In addition, two memories, 312 and 314, are connected to bus 302 along with two I/O devices 316 and 318. Each of the processors, 304-310, has a cache, 320-326 respectively. Compare unit 328 may be used to compare the output of CPU1 and CPU2 when CPU1 and CPU2 are operating in safety mode (lock-step). Compare unit 330 may be used to compare the output of CPU3 and CPU4 when CPU3 and CPU4 are operating in safety mode (lock-step).

Any of the processors, 304-310, may write and read data from the memories 312 and 314 and the I/O devices 316 and 318. In a multi-processor system 300 as shown in FIG. 3, the processors may be used to execute a single sequence of instructions in multiple contexts, used for redundancy in safety mode systems, or multiple sequences of instructions in multiple contexts.

Data from a cache in a particular CPU may be used in another CPU using cache-forwarding. For example, if CPU1 needs the data from CPU4's cache and CPU3 has a copy of that data, then CPU3 will send that data to CPU1 in response to a snoop it received and CPU4 will counter check that data in the next cycle. This results in high speed and efficient data transfer between the processors. Cache-forwarding is also useful during operation in the safety mode.

Figure 4:
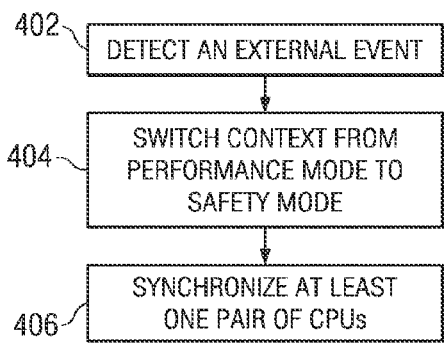
FIG. 4 is a flow chart illustrating an embodiment of a method of changing from a performance mode to a safety mode in a multi-processor system.

FIG. 4 is a flow chart illustrating an embodiment of a method of changing from a performance mode to a safety mode in a multi-processor system. In this embodiment, a multi-processor system detects when an external event or exception occurs in step 402. For example, the exception may be an interrupt. An interrupt may be a hardware or a software interrupt. A software interrupt is an interrupt generated within a processor by executing an instruction. Software interrupts are often used to implement system calls because they implement a subroutine call with a CPU ring change.

The interrupt may also be an IRQ (interrupt request), an NMI (non-maskable interrupt) or an IPI (inter-processor interrupt). An NMI is a hardware interrupt that lacks an associated bit-mask, so that it can never be ignored. NMIs are often used for timers, especially watchdog timers. An inter-processor interrupt (IPI) is a special case that is generated by one processor to interrupt another processor in a multi-processor system.

During step 404, context is switched from the performance mode to the safety mode. A context switch is the process of storing and restoring the state (context) of a CPU so that execution can be resumed from the same point at a later time. In this embodiment, the performance mode context of each CPU is stored in a memory location in the multi-processor system. The memory location may be a stack. The performance mode context also includes a stack pointer for each CPU.

Next, the safety mode context is loaded from memory in the multi-processor system. The safety mode context may be loaded from a shack. The safety mode context is loaded into at least two CPUs. The safety mode may also be run with more than two CPUs having the same context. The same software is run on all the CPUs that are running in lock-step.

During synchronization, step 406, of the CPUs running in the safety mode, the execution of each CPU is suspended while parts of each CPU is reset. For example, the PFU (pre-fetch unit) and the RTU (return stack unit) may be reset. Synchronization also includes resetting a compare unit, engaging the compare unit and a cache from a first CPU with a second CPU, and finally starting execution of each CPU used in safety mode. During the method shown in FIG. 4, the multi-processor system continued to operate without rebooting the system.

Figure 5:
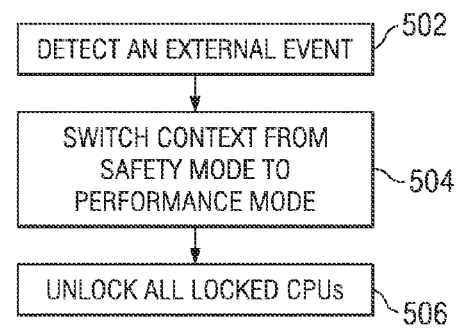
FIG. 5 is a flow chart illustrating an embodiment of a method of changing from a safety mode to a performance mode in a multi-processor system.

FIG. 5 is a flow chart illustrating an embodiment of a method of changing from a safety mode to a performance mode in a multi-processor system. In this embodiment, a multi-processor system detects when an external event or exception occurs in step 502. For example, the exception may be an interrupt. An interrupt may be a hardware or a software interrupt. The interrupt may also be an IRQ (interrupt request), an NMI (non-maskable interrupt) or an IPI (inter-processor interrupt).

During step 504, context is switched from the safety mode to the performance mode. In this embodiment, the safety mode context of each CPU is stored in a memory location in the multi-processor system. The memory location may be a shack. The safety mode context also includes a stack pointer for each CPU. Next, the performance mode context is loaded from memory in the multi-processor system. In one embodiment of the invention, the location of the performance mode context may be found by looking in each ID (identification) register of each CPU. After the location of each performance mode context is found, a performance mode context is loaded into each CPU. The performance mode context may be loaded from a shack.

During step 506, locked CPUs are unlocked from each other and the compare unit is notified to stop lock-step execution. After disengaging the compare unit, cache-forwarding is disengaged. At this point the multi-processor system is operating in the performance mode. During the method shown in FIG. 5, the multi-processor system continued to operate without rebooting the system.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method of changing from a performance mode to a safety mode in a multi-processor system that includes a first central processing unit (CPU) and a second CPU, the method comprising:
    detecting an external event;
    saving a performance mode context of the first CPU in a memory;
    saving a performance mode context of the second CPU in the memory;
    loading a safety mode context from the memory into the first CPU and the second CPU; and
    synchronizing the first and second CPUs, wherein synchronizing the first and second CPUs includes resetting parts of each of the first and second CPUs without rebooting the multi-processor system,
    wherein software continues to operate on the multi-processor system.

2. The method of claim 1 wherein the external event is an interrupt.

3. The method of claim 2 wherein the interrupt is selected from a group consisting of an IRQ (interrupt request), an NMI (non-maskable interrupt) and an IPI (inter-processor interrupt).

4. The method of claim 1 wherein switching context further comprises:
    saving a performance mode stack pointer for each of the first and second CPUs.

5. The method of claim 1 wherein the switching context further comprises:
    starting execution of a same software on each of the first and second CPUs.

6. The method of claim 1 wherein synchronizing the first and second CPUs further includes:
    suspending execution of each of the first and second CPUs;
    resetting a compare unit;
    engaging the compare unit and a cache from the first CPU with the second CPU; and
    starting execution of each of the first and second CPUs.

7. The method of claim 1 wherein resetting the parts of each of the first and second CPUs includes resetting at least one of a pre-fetch unit (PFU) or a return stack unit (RTU) in each of the first and second CPUs without rebooting the multi-processor system.

* * * * *